United States Patent
Nekovee (10) Patent No.: US 10,075,852 B2
(45) Date of Patent: Sep. 11, 2018

(54) APPARATUS AND METHOD FOR SCHEDULING BEAM SCHEDULING IN WIRELESS COMMUNICATIONS NETWORK

(71) Applicant: Samsung Electronics Co., Ltd., Suwon-si, Gyeonggi-do (KR)

(72) Inventor: Maziar Nekovee, Staines (GB)

(73) Assignee: Samsung Electronics Co., Ltd., Suwon-si (KR)

(*) Notice: Subject to any disclaimer, the term of this patent is extended or adjusted under 35 U.S.C. 154(b) by 169 days.

(21) Appl. No.: 15/160,730

(22) Filed: May 20, 2016

(65) Prior Publication Data

US 2016/0353467 A1    Dec. 1, 2016

(30) Foreign Application Priority Data

May 28, 2015 (GB) .................................. 1509177.0
Mar. 7, 2016 (KR) ........................ 10-2016-0027204

(51) Int. Cl.
| | |
|---|---|
| *H04W 4/00* | (2018.01) |
| *H04W 16/28* | (2009.01) |
| *H04L 5/00* | (2006.01) |
| *H04W 72/08* | (2009.01) |
| *H04W 88/02* | (2009.01) |
| *H04W 88/08* | (2009.01) |
| *H04W 72/04* | (2009.01) |

(52) U.S. Cl.
CPC .......... *H04W 16/28* (2013.01); *H04L 5/0048* (2013.01); *H04W 72/085* (2013.01); *H04W 72/046* (2013.01); *H04W 88/02* (2013.01); *H04W 88/08* (2013.01)

(58) Field of Classification Search
CPC .............................. H04W 16/28; H04L 5/0048
USPC .......................................................... 370/329
See application file for complete search history.

(56) References Cited

U.S. PATENT DOCUMENTS

| | | | | |
|---|---|---|---|---|
| 2009/0296663 | A1* | 12/2009 | Wild .................. | H01Q 1/246 370/335 |
| 2014/0056256 | A1 | 2/2014 | Kim et al. | |
| 2016/0337916 | A1* | 11/2016 | Deenoo ................... | H04W 8/22 |

FOREIGN PATENT DOCUMENTS

| | | |
|---|---|---|
| CN | 103618567 A | 3/2014 |
| CN | 103701515 A | 4/2014 |

* cited by examiner

*Primary Examiner* — Christopher R Crompton
(74) *Attorney, Agent, or Firm* — Jefferson IP Law, LLP (57) ABSTRACT

The present disclosure relates to a pre-5$^{th}$-Generation (5G) or 5G communication system for supporting higher data rates Beyond 4$^{th}$-Generation (4G) communication systems such as Long Term Evolution (LTE). A method for operating a base station in a wireless communications network which communicates with mobile terminals using directional beams is provided by determining a set of beams for communicating with a plurality of mobile terminals, determining a set of beam sequences, each beam sequence comprising a unique order of beams within the set of beams, transmitting probe signals to the mobile terminals according to each beam sequence within the set of beam sequences, receiving indications of link quality from the mobile terminals in response to the probe signals, selecting a beam sequence within the set of beam sequences based upon the received indications of link quality, and communicating with the mobile terminals in accordance with the selected beam sequence.

17 Claims, 8 Drawing Sheets

APPARATUS AND METHOD FOR SCHEDULING BEAM SCHEDULING IN WIRELESS COMMUNICATIONS NETWORK

CROSS-REFERENCE TO RELATED APPLICATION(S)

This application claims the benefit under 35 U.S.C. § 119(a) of a United Kingdom patent application filed on May 28, 2015 in the United Kingdom Intellectual Property Office and assigned Serial number 1509177.0, and a Korean patent application filed on Mar. 7, 2016 in the Korean Intellectual Property Office and assigned Serial number 10-2016-0027204, the entire disclosure of which is hereby incorporated by reference.

TECHNICAL FIELD

The present disclosure relates to beam scheduling. More particularly, the present disclosure relates to the scheduling of directional beams formed by a base station in a wireless communications network. The present disclosure relates in particular to beam scheduling intended to provide for spectrally efficient coexistence of multiple interfering base stations deployed in the extremely high frequency (EHF) band (roughly in the 30-300 GHz range), such as an unlicensed 60 GHz band which may be using multiple radio access technologies and which may belong to multiple operators.

BACKGROUND

To meet the demand for wireless data traffic having increased since deployment of $4^{th}$-generation (4G) communication systems, efforts have been made to develop an improved $5^{th}$-generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Meanwhile, wireless or mobile (i.e., cellular) communications networks in which a mobile terminal (e.g., user equipment (UE), such as a mobile handset) communicates via a radio link to a network of base stations or other wireless access points connected to a telecommunications network, have undergone rapid development through a number of generations.

The initial deployment of systems using analogue signaling was superseded by second generation (2G) digital systems such as global system for mobile communications (GSM). Second generation systems have themselves been largely replaced or augmented by third generation (3G) digital systems such as the universal mobile telecommunications system (UMTS), which uses a universal terrestrial radio access network (UTRAN) radio access technology and a core network similar to GSM. UMTS is specified in standards produced by the $3^{rd}$ generation partnership project (3GPP). 3G standards provide for a greater throughput of data than is provided by second generation systems. This trend is continued with the move towards fourth generation (4G) systems which are now widely deployed.

3GPP design specify and standardize technologies for mobile wireless communications networks. Specifically, 3GPP produces a series of technical reports (TR) and technical specifications (TS) that define 3GPP technologies. In particular, 3GPP specify standards for 4G systems including an evolved packet core (EPC) and an enhanced radio access network called "evolved UTRAN (E-UTRAN)". The E-UTRAN uses long term evolution (LTE) radio technology, which offers potentially greater capacity and additional features compared with previous standards. Despite LTE strictly referring only to the air interface, LTE is commonly used to refer to the entire system including both the EPC and the E-UTRAN. LTE is used in this sense in the remainder of this specification, and also should be understood to include LTE enhancements such as LTE Advanced which offers still higher data rates compared to LTE and is defined by 3GPP standards releases from 3GPP Release 10 up to and including 3GPP Release 12. LTE Advanced is considered to be a 4G mobile communication system by the International Telecommunication Union (ITU).

The trend towards greater data throughput continues with current research efforts developing fifth generation (5G) network technologies. While the form that 5G networks may take and the use cases for such networks are currently unclear, it is probable that 5G networks will include a blend of technologies and will include the capacity to provide extremely high data rates to mobile users in relatively compact geographical areas. This is likely to supplement rather than replace existing wider ranging but lower data rate LTE services.

The focus of the present disclosure is on 5G radio access technologies, for instance in the unlicensed 60 GHz band, which provide for significantly higher peak data rates compared with LTE systems. However, one way in which the 60 GHz spectrum can be exploited is through the deployment of 60 GHz small cells (e.g., through a base station which may be referred to herein as a 5G base station) under the control of LTE macro cells utilizing a core network which may be based upon the EPC. As such, an overview of an LTE network is shown in FIG. 1 and the inter-relationship between LTE macro cells and 60 GHz small cells will be described later in connection with FIG. 2.

Figure 1:
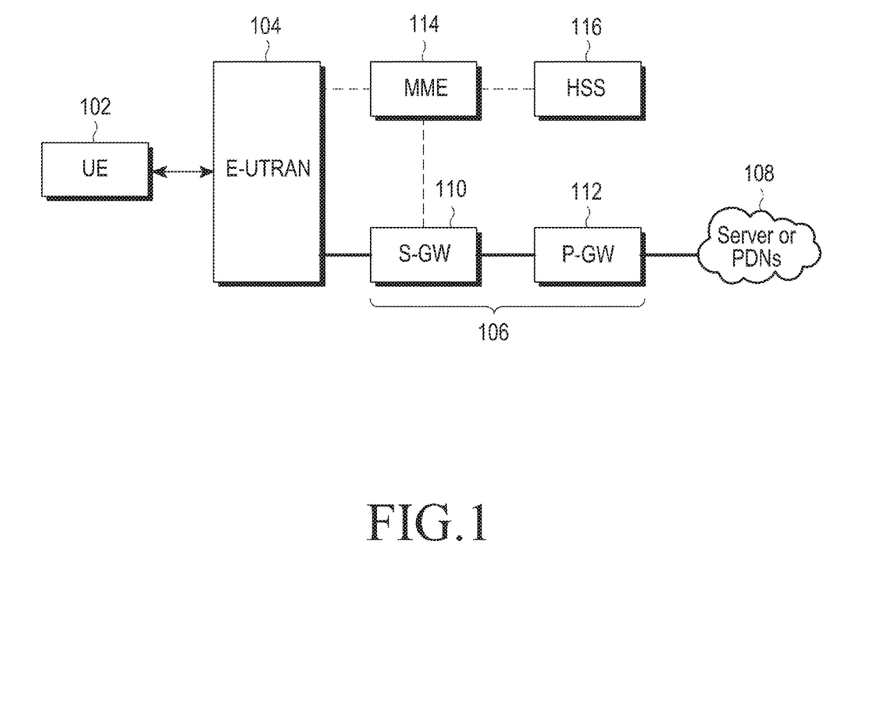
FIG. 1 illustrates an overview of a long term evolution (LTE) mobile communication network according to the related art.

FIG. 1 illustrates an overview of an LTE mobile communication network according to the related art.

Referring to FIG. 1, an LTE system comprises three high level components including at least one UE 102, E-UTRAN 104 and EPC 106. The EPC 106 (e.g., core network) communicates with external packet data networks (PDNs) and servers 108. Referring to FIG. 1, interfaces between different parts of the LTE system are shown. The double ended arrow indicates an air interface between the UE 102 and the E-UTRAN 104. For the remaining interfaces, user data is represented by solid lines and signaling is represented by dashed lines.

The E-UTRAN 104 (e.g., radio access network (RAN)) comprises an E-UTRAN node B (eNB), though typically a plurality of eNBs are deployed, which are responsible for handling radio communications between the UE 102 and the EPC 106 across the air interface. LTE is a cellular system in which the eNBs provide coverage over one or more cells.

Key components of the EPC 106 are shown in FIG. 1. It will be appreciated that in an LTE network there may be more than one of each component according to the number of UEs 102, the geographical area of the network and the volume of data to be transported across the network. Data traffic is passed between each eNB and a corresponding serving gateway (S-GW) 110 which routes data between the eNB and a PDN gateway (P-GW) 112. The P-GW 112 is responsible for connecting a UE to one or more external servers or PDNs 108. A mobility management entity (MME) 114 controls the high-level operation of the UE 102 through signaling messages exchanged with the UE 102 through the E-UTRAN 104. The MME 114 exchanges signaling traffic with the S-GW 110 to assist with routing data traffic. The MME 114 also communicates with a home subscriber server (HSS) 116 which stores information about users registered with the network.

An increase in consumer demand for wireless broadband data is evident from the fast uptake of LTE across the world. In view of this, and in view of the high cost associated with increasing the capacity of LTE networks, data service suppliers and operators are increasingly studying how to augment those networks. One such method involves using the unlicensed spectrum to compliment LTE broadband data services. The move to the additional use of unlicensed spectrum is driven in part by the desire to increase data rates to consumers through opening up new parts of the spectrum, but also due to the considerable investment required, and the long regulatory delay incurred, when obtaining new licensed spectrum. Additionally, a substantial portion of the licensed spectrum around existing frequencies used by LTE is already in use. Finding licensed spectrum of sufficient bandwidth to support proposed 5G networks is challenging.

The unlicensed spectrum may be exploited by operators offloading traffic from the licensed spectrum to unlicensed spectrum, for instance in the 2-5 GHz band, thereby making use of, for example, Wi-Fi (via LTE/Wi-Fi interworking), LTE over unlicensed (LTE-U), or license-assisted access (LAA) technology. 3GPP Release 13 is expected to include support for LTE operation in the unlicensed 5 GHz band. The on-going 3GPP study is scheduled to be completed in June 2015 and will also cover the mechanisms for coexistence in the 5 GHz band.

In LAA, a primary LTE cell operating in the licensed spectrum is aggregated with a secondary cell operating in the unlicensed spectrum. That is, LAA may allow for centralized scheduling to be performed by the eNB, which also handles carrier selection for UEs under its control. LTE-U can be considered to provide a broader networking solution to that provided by LAA technology, for example by providing a standalone LTE-U solution where only unlicensed frequencies are used in a network which otherwise operates in accordance with a configuration typical of LTE. While the licensed spectrum is used to provide critical information and ensure quality of service (QoS), the unlicensed spectrum can be leveraged to increase data rate when required.

A result of this use of unlicensed spectrum is that network operators no longer have exclusive access to a spectrum band. Where there is exclusive access to an assigned band, transmissions may be coordinated across the network to allow for the coexistence of multiple base stations and mobile devices through centralized planning of time-frequency resources or through peer-to-peer signaling. In the unlicensed spectrum this coordination is not always possible as there is no requirement for network operators to notify each other of their use of the spectrum.

One option to ensure fair access to the unlicensed spectrum, and to minimize interference, is the use of a listen-before-talk (LBT) procedure to sense carriers before transmission and to facilitate effective sharing of the unlicensed spectrum. The LBT procedure is a contention-based protocol which may be described as a mechanism by which an equipment or component (e.g., a UE or eNB) applies a clear channel assessment (CCA) check prior to using a channel. By using energy detection (as a minimum), the CCA allows the existence of other signals on the channel to be determined. As a result, it can therefore be determined whether or not the channel is clear or occupied.

In LBT, eNB attempts to access a channel only at a pre-assigned time instants are denoted as "transmission opportunities". At a transmission opportunity, if the eNB has to send data and it is not already transmitting, sensing takes place which is based on the detection of energy in the channel during a predefined time interval. If the detected energy is below a threshold, the channel is deemed to be available and transmission takes place. If the detected energy is above the threshold, the channel is deemed to be busy and no transmission occurs. A coexistence gap provides opportunities to other networks operating in the same band using gaps in LTE transmission. Coexistence gaps are silent gaps, which may be considered to be LTE "OFF" periods. The eNB resumes transmission at the end of each coexistence gap without assessing the availability of the channel. LBT allows for effective data packet transmission between components sharing a network or transmission medium. However, a problem may occur in these networks when a hidden node is present. In this case, a hidden node may be defined as a first node (e.g., a WLAN access point (AP) or an eNB belonging to another network operator) which is visible to a second node (e.g., a UE) but is not visible to a third node (e.g., an eNB), where the third node is communicating with the second node. This lack of visibility may simply be a result of the nodes being out of range of each other, and so the first node is hidden, or invisible, to the third node (and potentially vice versa). A hidden node may also be caused by being around a corner from a directional beam transmission (i.e., the node made be out of the path of the directional beam). The existence of the hidden node may cause problems such as data packet collision and corruption. The existence of hidden nodes may result in interference that cannot be mitigated by the use of the LBT procedure.

As noted above, to meet the continually increasing demand for higher data rates and higher volumes of data transmitted through wireless communication systems, one option is to use a wider frequency band, such as may be available in the extremely high frequency (EHF) band from 30 GHz to 300 GHz, or wider still, for instance to include spectrum around 28 GHz. Radio waves in this band range from 10 mm to 1 mm and so the band is sometimes referred to as the millimeter band or millimeter wave (mmW). In particular, unlicensed spectrum around 60 GHz may be exploited to provide a high data rate service in a small cell, typically supplementing an LTE macro cell. An approximately 8 GHz bandwidth is available in the 60 GHz unlicensed band and this could be used for cellular systems: a concept which may be referred to as pre-5G (pending standardization of 5G technologies). The precise range of the unlicensed 60 GHz spectrum varies between different territories. Referring to Table 1 below, this shows the unlicensed 60 GHz spectrum bands in seven different territories. Table 2 further identifies the maximum equivalent isotropically radiated power (EIRP) in decibel-milliwatts (dBm) for each band together with the maximum transmission power within a beam. For the purposes of the present disclosure the precise unlicensed band under consideration is not relevant, only that directional beams are used.

TABLE 1

| Territory | Lower limit - GHz | Upper Limit - GHz | EIRP - dBm | Max - dBm |
|---|---|---|---|---|
| Australia | 59 | 63 | 52 | 13 |
| Canada | 57 | 64 | 43 | 27 |
| China | 59 | 64 | 47 | 10 |
| Europe | 57 | 66 | 55 | 10 |
| Japan | 59 | 66 | 57 | 10 |
| South Korea | 57 | 64 | 57 | 10 |
| USA | 57 | 64 | 43 | 27 |

Radio waves in the 60 GHz band are subject to high atmospheric attenuation due to absorption by gases in the atmosphere and so are limited in range, though with the benefit of allowing for smaller frequency reuse distances. EHF transmissions are also substantially line of sight and are readily blocked by objects in their path, or reflected or diffracted by building edges.

These limitations on EHF transmissions may be mitigated through the use of beam-forming which can increase effective transmission range. Beam-forming may be classified into transmission beam-forming and reception beam-forming. Transmission beam-forming concentrates a reach region of a radio wave in a specific direction using a plurality of antennas (i.e., an antenna array). Transmission range is increased in the intended direction and is minimized in other directions. Interference to other users in directions other than the intended direction is reduced. In reception beam-forming a reception side concentrates the reception of radio waves from an intended direction using a reception antenna array. The received signal strength from the intended direction is increased and the received signal strength from other directions is minimized.

It will be appreciated that where the unlicensed 60 GHz band is used, then the same need to minimize interference from other users of the spectrum discussed above in connection with LAA also arises. The 60 GHz band is already well used, in particular for point-to-point high bandwidth communication links. It is additionally proposed for use by WirelessHD (also known as UltraGig) for the transmission of high definition video content between consumer electronic devices and by the wireless gigabit alliance (WiGig) which promotes the use of the 60 GHz band for wireless networking in accordance with the Institute of Electrical and Electronic Engineers (IEEE) 802.11ad standard. However, the LBT procedure described above is considered ineffective where highly directional transmissions are used, as is the case for EHF transmissions. In contrast, the transmission scenario envisioned for LAA in the 2-5 GHz band is omnidirectional or sectorial (i.e., the antenna radiation pattern of the transmit antenna has a wide beam width). For example a 5G base station implementing LBT and which has directed its receiver beam in a certain direction may not "hear" the transmission by another nearby 5G base station (or for instance, a WiGig AP). The 5G base station will therefore assume the channel to be free, hence starting a transmission which can cause interference to the victim system (e.g., a 5G base station belonging to a different operator or a WiGig AP). Additionally, LBT is spectrally inefficient, which undermines a significant part of the rationale behind moving to 60 GHz transmissions in the first place.

WiGig attempts to address the problem of interference by using a contention based approach where at any given time the entire channel is allocated to a single user, but users contend for time-slots to be served using a hybrid time division multiple access (TDMA)-carrier sense multiple access (CSMA) scheme based on IEEE 802.11 enhanced distributed channel access (EDCA). WiGig supports up to four transmitter antennas, four receiver antennas, and 128 sectors. Beam-forming is mandatory in 802.11ad, and both transmitter-side and receiver-side beam-forming are supported. The WiGig contention based approach also suffers from spectral inefficiency.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method for spectrally efficient coexistence of multiple interfering base stations or other transmitters in the 60 GHz band. This spectrally efficient coexistence is not contingent on coordination or cooperation between multiple operators, and is effective regardless of radio access technologies used by those operators.

In accordance with an aspect of the present disclosure, a method for operating a base station in a wireless communications network in which a base station communicates with mobile terminals using directional beams is provided. The method includes determining a set of beams for communicating with a plurality of mobile terminals, determining a set of beam sequences, each beam sequence comprising a unique order of beams within the set of beams, transmitting probe signals to the mobile terminals according to each beam sequence within the set of beam sequences, receiving indications of link quality from the mobile terminals in response to probe signals, selecting a beam sequence within the set of beam sequences based upon the received indications of link quality, and communicating with the mobile terminals in accordance with the selected beam sequence.

In accordance with another aspect of the present disclosure, a method for operating a mobile terminal in a wireless communications network in which a base station communicates with the mobile terminal using a directional beam is provided. The method includes receiving probe signals from the base station according to two or more beam sequences applied by the base station, transmitting an indication of link quality to the base station in respect to a received probe signal, and communicating with the base station in accordance with a beam sequence established by the base station based on the transmitted indication of link quality.

In accordance with another aspect of the present disclosure, a base station is provided including a controller configured to determine a set of beams for communicating with a plurality of mobile terminals and determine a set of beam sequences, each beam sequence comprising a unique order of beams within the set of beams, a transmitter configured to transmit probe signals to the mobile terminals according to each beam sequence within the set of beam sequences, and a receiver configured to receive indications of link quality from the mobile terminals in response to the probe signals, wherein the controller is further configured to select a beam sequence within the set of beam sequences based upon the received indications of link quality, and wherein the transmitter is further configured to communicate with the mobile terminals in accordance with the selected beam sequence.

In accordance with another aspect of the present disclosure, a mobile terminal is provided including a receiver configured to receive probe signals from a base station according to two or more beam sequences applied by the base station, a transmitter configured to transmit an indication of link quality to the base station in respect to a received probe signal, and a controller configured to communicate with the base station in accordance with a beam sequence established by the base station based on the transmitted indication of link quality.

In accordance with another aspect of the present disclosure, a computer readable storage medium having stored thereon computer executable instructions which when executed by a computer cause the computer to perform the above method is provided.

In accordance with another aspect of the present disclosure, a computer program comprising instructions arranged to, when executed, implement a method and/or apparatus in accordance with any one of the above-described aspects is provided. A further aspect provides machine-readable storage storing such a program.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a", "an", and "the", include plural referents unless the context clearly dictates otherwise. Thus, for example, reference to "a component surface" includes reference to one or more of such surfaces.

Various embodiments of the present disclosure will now be described in the context of a fifth generation (5G) network implementation in which a long term evolution (LTE) compliant mobile wireless communications network is augmented by small cells operating in an unlicensed 60 GHz band. However, it will be understood that this is by way of example only and that other embodiments may involve other wireless networks, operating in compliance with other radio access technologies. While reference is made herein to a method of beam sequence selection implemented by a 5G base station, at its most general the present disclosure should be understood to relate to a method by which any network component which transmits directional beams may adjust a beam sequence to maximize spectrum efficiency and minimize interference.

In the following description, a directional beam may be defined as one in which the majority of the transmitted power is transmitted within a relatively narrow beam width. This contrasts with an isotropic beam in which the power is approximately equally transmitted in all directions. This is done in order to maximize received power in a given direction and to minimize received power in unintended directions. This serves to mitigate path loss and also allows tighter frequency reuse distances. A directional beam may be defined by a beam width. A beam width is usually defined in terms of the angular range of a beam within which the power is above a threshold proportion of the power along the axis of the beam. Directional beams may also be defined in terms of the additional antenna gain, with reference to an omnidirectional antenna, required in order to achieve the desired link budget in a given deployment scenario.

Determining a set of beams may include determining a beam direction for each of a plurality of mobile terminals that allows the base station to transmit data to and receive data from the mobile terminal. The plurality of mobile terminals may include mobile terminals located within a predetermined distance inside of an edge of a cell within which the base station can communicate with mobile terminals. A set of beam sequences may include all possible unique beam sequences within the set of beams, or a subset of all possible unique beam sequences. Selecting a beam sequence may include computing a utility function in respect to each beam sequence within the set of beam sequences based on the received indications of link quality, and selecting a beam sequence according to the computed utility functions. Selecting a beam sequence according to the computed utility functions may include assigning a probability to each beam sequence according to the computed utility functions, and probabilistically selecting a beam sequence according to the assigned probabilities.

Assigning a probability to each beam sequence may include assigning a probability to each sequence in the set of beam sequences on the basis of the probability assigned to the preceding sequence in the set of beam sequences and the utility function computed in respect to the preceding sequence, or assigning a maximum probability to a sequence in the set of beam sequences if the utility function computed in respect to the preceding sequence is the maximum computed utility function, and assigning a minimum probability otherwise. Probabilistically selecting a beam sequence may include determining a cumulative probability in respect to each sequence in the set of beam sequences, randomly selecting a number between a minimum probability and a maximum probability, and selecting the sequence for which the randomly selected number exceeds the cumulative probability in respect to the preceding beam sequence in the set of beam sequences but is less than the cumulative probability in respect to that beam sequence.

As discussed above, when communicating in a 60 GHz band, beam-forming is generally necessary to combat server path loss. For any practical wireless communication system of the type described in this document, beam-forming should be considered to be mandatory. While beam-forming in its own right serves to reduce interference, without optimal scheduling of beams, interference could be severe due to the possibility of beam collisions. Various access networks operating in 60 GHz may use different resource allocation strategies for multi-user access. For example, 60 GHz cellular systems may use time-frequency resource blocks similar to LTE, where the available spectrum bandwidth is divided into a number of frequency and time slots and users are then served through scheduling of resource blocks. The beam direction may also be considered to be a feature that allows for multiplexing in addition to the time-frequency resource blocks used in LTE.

Figure 2:
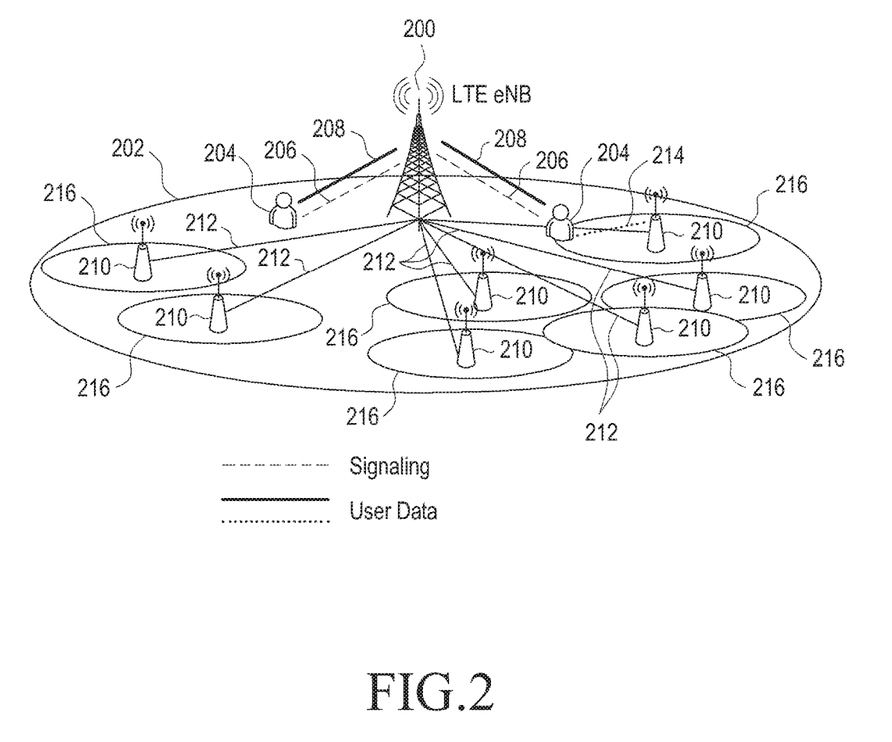
FIG. 2 illustrates the integration of an LTE macro cell and 60 GHz fifth generation (5G) small cells providing high data rates to users according to an embodiment of the present disclosure.

FIG. 2 illustrates integration of an LTE macro cell and 60 GHz 5G small cells providing high data rates to users according to an embodiment of the present disclosure.

Referring to FIG. 2, FIG. 2 shows the integration of 60 GHz small cells into an LTE (or similar) fourth generation (4G) network. FIG. 2 shows an LTE evolved node B (eNB) 200 which is broadcasting in a licensed LTE band within a macro cell 202 to users 204 (assumed herein to be user equipment (UEs)). The LTE transmissions may be restricted only to network signaling indicated by dashed lines 206. It is desirable that signaling is sent via the LTE RAN owing to its greater reliability due to exclusive spectrum use and reduced signal attenuation in the licensed frequency bands. Additionally, some user data may be transmitted between the eNB 200 and the UE 204 as indicated by solid lines 208. Integrated with that LTE network is a plurality of high capacity 60 GHz wireless access points (APs) 210 serving small cells that are connected directly to the eNB 200 via wired or wireless links 212. A 60 GHz AP may be alternatively referred to as a 5G base station in the current document to signify that it acts as a base station in a 5G wireless communication network.

The 60 GHz APs 210 are under the control of the eNB 200 and transmit user data to, and receive user data from, UEs as indicated by dotted line 214 when a UE is within range of a 5G base station 210. The range of a 60 GHz base station 210 is indicated by the ovals 216 though as discussed above, communication is achieved using beam-forming to generate highly directional transmission and reception beams. The 5G base stations serve as hotspots providing high user data rates and are located where such high data rates may be required, for instance, in offices and busy public spaces.

Figure 3:
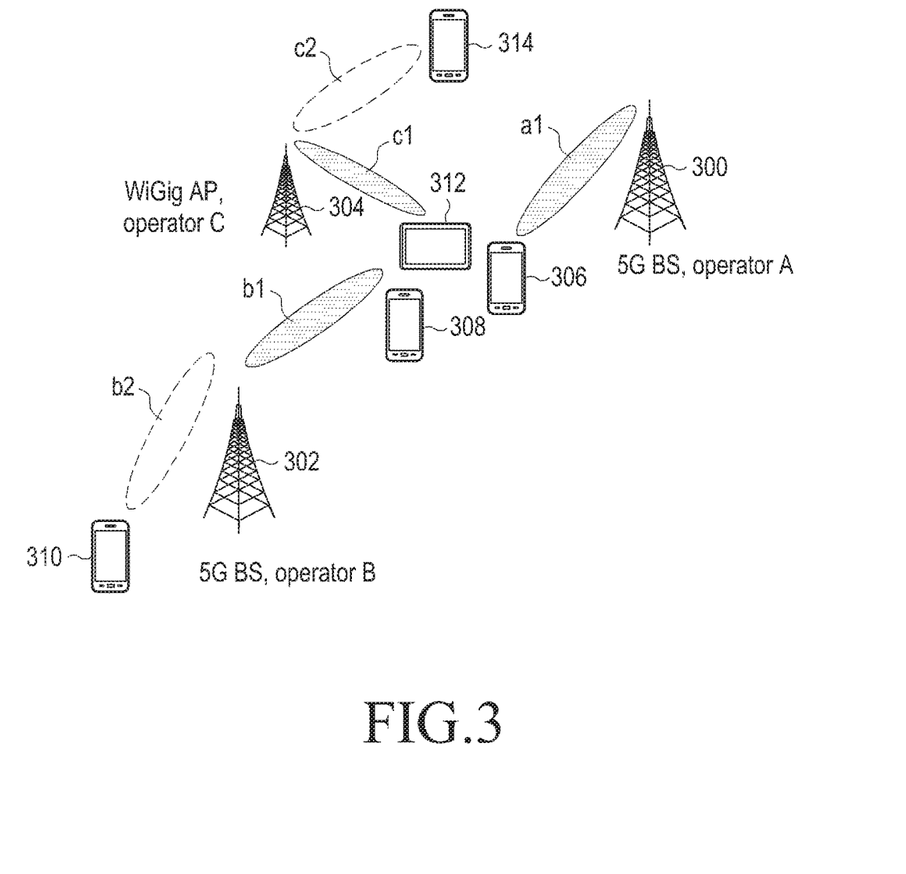
FIG. 3 illustrates interference in a 60 GHz coexistence scenario resulting from inappropriate beam selection according to an embodiment of the present disclosure.

To efficiently utilize the unlicensed spectrum for 5G cellular systems, in addition to a physical layer, a medium access control (MAC) layer and network layer algorithms suitable for the nature of the 60 GHz unlicensed band, efficient interference mitigation and coexistence mechanisms are required. As discussed above, efficient interference mitigation and coexistence mechanisms must take into account sharing of the band with other 5G cellular systems operating in this band (e.g., those belonging to different operators) as well as with systems using other standards (e.g., wireless gigabit alliance (WiGig)) which can also be operating in the 60 GHz band. Referring now to FIG. 3, this illustrates such a deployment scenario.

FIG. 3 illustrates interference in a 60 GHz coexistence scenario resulting from inappropriate beam selection according to an embodiment of the present disclosure.

FIG. 3 shows first and second 5G base stations 300, 302 operated by different network operators (operator A and operator B, respectively). It is assumed that each operator is either unaware of the presence of the other or that they choose not to coordinate their transmissions. Should cooperation be possible, then beam sequences may be synchronized to maximize spectral efficiency while minimizing interference in the same way that this may be performed where there are multiple 5G base stations operated by a single operator.

FIG. 3 further shows a WiGig AP 304 operated by operator C. In a multi-standards and multi-operator spectrum sharing scenario coordination among different systems is challenging or impossible because cellular systems and, for instance, WiGig, use very different physical and MAC layers (e.g., different frame structures, and so forth) so that direct signaling and synchronization between these networks is not possible. Each 5G base station or AP 300, 302, 304 may be transmitting in the same portion of the 60 GHz band to one or more devices 306-314 such as UEs and other fixed or mobile electronic devices. Each 5G base station or AP 300-304 is capable of transmitting data through a plurality of different beams, though only those suitable for communicating with the illustrated devices 306-314 are shown.

Referring to FIG. 3, each 5G base station or AP is assumed to only be able to transmit data using a single beam at a time, though it will be appreciated that it is possible that some 5G base stations or APs may be able to transmit through multiple beams at the same time where they are provided with multiple antenna arrays. Specifically, 5G base station 300 is shown as being able to transmit data to device 306 using beam a1. 5G base station 302 is able to transmit data to device 308 using beam b1 and is able to transmit data to device 310 using beam b2. WiGig AP 304 is able to transmit data to device 312 using beam c1 and is able to transmit data to device 314 using beam c2. Referring to FIG. 3, those beams that are transmitting at a given instant are shown in solid lines, the remainder in dashed lines. It can be seen that if at one instant beams a1, b1, c1 are transmitting then interference is highly likely as those beams intersect in the region of devices 306, 308 and 312. Such an interference scenario through unfortunate beam timing becomes increasingly likely as the number of APs, beams and devices increase.

Figure 4:
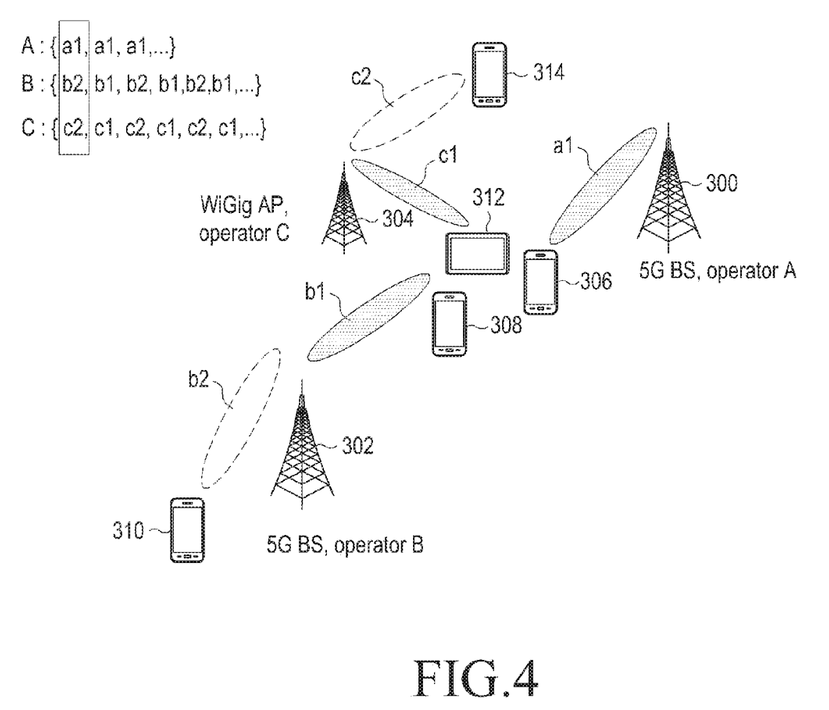
FIG. 4 illustrates optimal beam sequence selection such as may result from application in a 60 GHz coexistence scenario according to an embodiment of the present disclosure.

FIG. 4 illustrates optimal beam sequence selection such as may result from application in a 60 GHz coexistence scenario according to an embodiment of the present disclosure.

Referring to FIG. 4, according to an embodiment of the present disclosure, an adaptive and distributed solution to beam sequence selection is provided whereby each 5G base station dynamically adapts scheduling of beams to its own users. It can be seen that for each 5G base station or WiGig AP a beam sequence is defined, as shown in the upper left of FIG. 4. For 5G base station 300, the beam sequence comprises transmission using beam a1 at each instant as this is the only beam in use for communicating with a UE. It can be seen that at each instant the beams that are transmitting are vertically aligned in the beam sequences, such that at the first illustrated instant (identified by a box shown in the upper left of FIG. 4) beams a1, b2 and c2 are transmitting. By ensuring that beams b1 and c2 are not transmitting simultaneously, the risk of interference due to collision of transmissions from 5G base station 302 and WiGig AP 304 is minimized.

The adaptive scheduling resulting in the optimal beam sequencing of FIG. 4 is described in greater detail below in connection with the flowchart of FIG. 5. The adaptive scheduling is based on each 5G base station (or other AP, though the examples below refer exclusively to 5G base stations) independently exploring the limited configuration space of its own beam sequences. The beam sequences may be tested to obtain feedback from the UEs that the 5G base station serves, and then applies a learning algorithm to select the optimal beam sequence. Various embodiments of the present disclosure do not rely on explicit signaling between base stations or intervention from a central controller for each 5G base station to select a beam sequence which results in the entire system operating very close to maximum spectral efficiency. After adaption, each base station/AP starts a new exploration phase whereby beam sequences may be redefined after a certain period of time. For example, a new exploration phase could be triggered by an event, for instance when a new UE enter or leaves the cell, periodically, or using a randomized timer.

Figure 5:
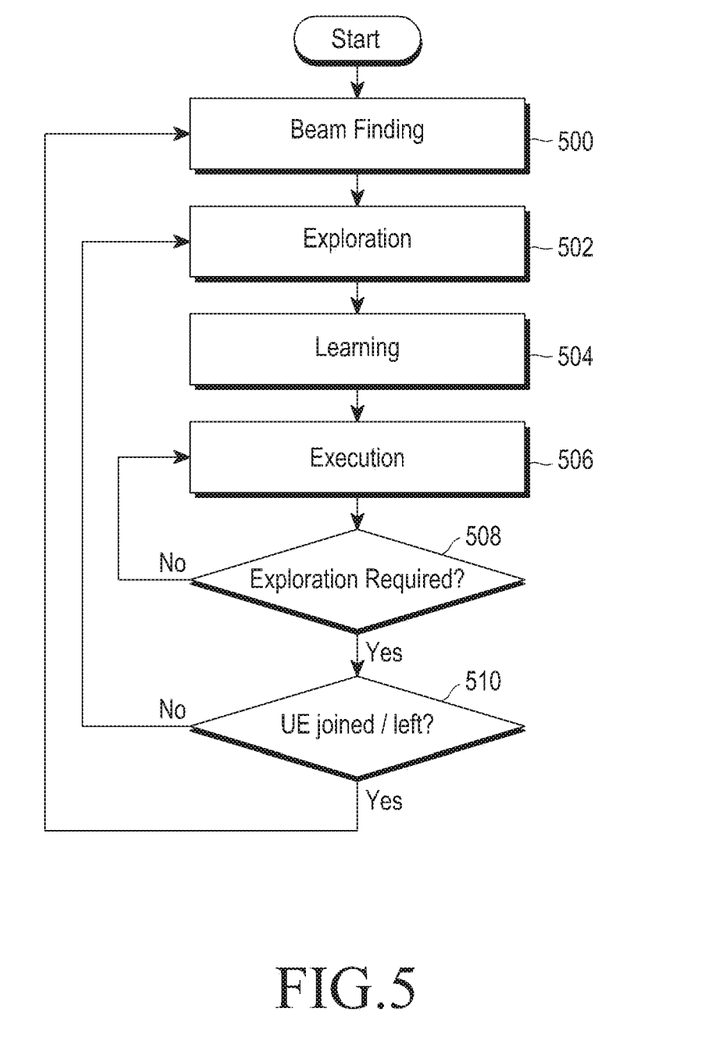
FIG. 5 is a flowchart illustrating a method of a base station or access point establishing a beam sequence according to an embodiment of the present disclosure.

FIG. 5 is a flowchart illustrating a method of establishing beam sequences at a 5G base station (or indeed any base station or AP operating using directional beams) according to an embodiment of the present disclosure.

Referring to FIG. 5, the method begins at operation 500 where a beam finding takes place. Beam finding is a process of the base station identifying each beam (i.e., each beam direction) on which it is required to transmit in order to transmit user data to each UE with which it is communicating. For example, the base station may establish a single beam associated with each device with which it is communicating, though each device may be associated with multiple beams and a single beam may be used to communicate with more than one device. Beam finding further comprises determining a set of possible beam sequences. Each sequence within the set represents one order in which the beams may be formed in order to sequentially communicate with each UE. FIG. 5 is based on the assumption that the 5G base station communicates with each UE on the same frequency, though one skilled in that art will appreciate that the present disclosure is extendable to a situation in which more than one frequency is used in addition to beamforming to minimize interference. The beams may suitably be the optimal beams for communicating with each device where more than one beam is capable of transmitting data to that device.

Referring to FIG. 4, for 5G base station 302 operated by operator B, the set of beam directions comprises $\{b_1, b_2\}$. More generally, for a set of $M_j$ UEs to which the base station is required to transmit data a set of beam directions $B_j$ is established where, $$i=1, M_j: \{b_1, b_2, \ldots, b_{M_j}\},$$

where i is an index for UEs and their associated beams, e.g., i=1, $M_j$ and j is an index for the base stations, j=1, ..., N.

In operation 500, a set of m beam sequencing combinations, C, is established:

$$C_1\{b_1, b_2, \ldots, b_{M_j}\}, C_2\{b_2, b_1, \ldots, b_{M_j}\}, \ldots, C_k\{b_{M_j}, \ldots\},$$

where each combination is a unique beam sequence that may be used by the base station to communicate with UEs within the 5G cell and represents the order in which the beams within that set may be formed. It will be appreciated that the set of beam sequencing combinations, C, may comprise all possible combinations of the set of beam directions. Alternatively, in order to cut down the computational complexity of the remainder of the method of FIG. 5, the set may be restricted to exclude sequences that are known to be interfering. For instance, in the event that a single operator has multiple base stations in the same area that coordinate their transmissions, known interfering combinations may be excluded. This may be achieved by using an LTE control channel under the control of an LTE eNB. It will also be understood that where a base station can transmit multiple beams at the same time, then the sequences may be extended to specify pairs or groups of simultaneous beams serving different UEs. Furthermore, each base station may transmit beams in predefined time slots, though these time slots may differ between base stations and there is no requirement for synchronization of time slots between base stations according to the present disclosure. Time slot synchronization is unlikely in a multiple operator and multiple radio access standards environment such as prevails in unlicensed spectrum.

The remainder of the method of FIG. 5 comprises determining an optimal beam sequence out of the set of possible beam sequence combinations. At operation 502 an exploration phase takes place. For each of the set of beam sequence combinations established at operation 500, the base station forms beams according to the sequence and transmits probe signals to the corresponding UEs using each respective beam. Alternatively, only a subset of the beam sequences may be transmitted.

For each transmitted sequence, the base station receives feedback from the corresponding UEs, for example the average reference signal received quality (RSRQ) or bit error rate (BER), which may be stored. This feedback may be returned directly to the 5G base station through a directional beam transmitted by the UE, or alternatively this feedback may be sent via the LTE eNB. More generally, the feedback provides a measure of link performance or link quality between the 5G base station and the respective UEs for that beam sequence. Specifically, for a set of $C_m$ beam sequences and k=1, m is a random beam sequence $C_k$ picked and for i=1, $M_j$ beams are formed according to sequence $C_k$ and feedback received from the UEs. If every possible unique beam sequence is included in the set of $C_m$ beam sequences then m=$M_j$. If a reduced set of beam sequences is used (e.g., excluding known interfering sequences as discussed above) then m<$M_j$. This exploration process is then repeated for each beam sequence combination in the set.

In one embodiment the beam sequences in the set may be explored sequentially, or sequentially starting from the randomly selected first sequence. The UE then computes a system-defined utility function for each tested beam sequence combination according to the received UE feedback. The utility function $U(C_k)$ for sequence $C_k$ is based on the cumulative feedback from the UEs. As only three examples, $U(C_k)$ may comprise the sum of, average or minimum UE feedback. Further examples of utility functions will be readily apparent to one skilled in the art depending upon the particular implementation scenario.

A learning phase takes place at operation 504, during which the base station selects one of the sets of possible beam sequence combinations $C_m$ based on the computed utility functions $U(C_k)$ obtained in the exploration phase at operation 502. Specifically, a discrete probability function $P(U(C_k))$ is established for each beam sequence and an optimal beam sequence $C_{opt}$ is selected probabilistically according to a probability function:

$$\{P(U(C_1)), P(U(C_2)), \ldots P(U(C_m))\}.$$

In an execution phase at operation 506, the selected optimal beam sequence combination $C_{opt}$ is used to transmit data to the UEs during a communication session. Specifically, for i=1, $M_j$ beams are formed according to sequence $C_{opt}$ to communicate with the $M_j$ UEs served by that base station. During the execution phase data is transmitted to (and optionally received from) the corresponding UEs and feedback may be collected from the UEs and stored. The form of the feedback may be the same as that which is transmitted from the UEs during the exploration phase 502, and may be sent in response to data transmitted from the base station to the UE.

At operation 508 it is determined whether another exploration phase at operation 502 is required. This is triggered if a significant change is detected (e.g., a new UE enters the cell, or if there is significant deterioration in link quality (e.g., a significant increase in BER/RSRQ) detected as a result of the feedback in the execution phase 506 or a randomized timer expires) which requires the base station to switch to a new optimal beam sequence for serving the UE. If no new exploration phase is required then the base station remains in the execution phase at operation 506.

If a new exploration phase is required, then at operation 510 it is determined whether this is because a UE has joined or left the cell. If so, then the base station first returns to the beam finding phase 500, otherwise the method proceeds to the exploration phase 502 using the previously calculated beam sequence combinations.

The beam finding operation 500 of FIG. 5 will now be described in greater detail. The base station/AP antenna gain (in dB) is given by:

$$G_{BS} = G_{omni} + G_{BF},$$

where $G_{omni}$ is the conventional (i.e., omnidirectional) antenna gain when no beam-forming is applied and $G_{BF}$ is the beam-forming gain. As an example, using analogue beam-forming, the beam-forming gain is obtained by controlling the phase and magnitude of the input signal to each antenna to form a directional beam towards a particular UE. The base station can compute the optimal beam configuration for each UE either dynamically (i.e., on the fly) or within a pre-defined beam codebook with cardinality N (or $N_t$ in the event that the cardinality may be variable over time if a codebook is recomputed based on changes in the number of UEs) that covers uniformly the azimuth directions around the base station. The codebook at a given base station, j, is formed by $N_t^j$ weight factors, $$\{\vec{v_1}, \vec{v_2}, \ldots, \vec{v_{N_t^j}}\} \text{ of dimension } N_{BS} * 1,$$

where $N_{BS}$ is the total number of base stations. Each vector is computed as:

$$\vec{v_i} = \frac{1}{\sqrt{N_{BS}}} \exp(jj(i-1)\pi\sin(\phi_i)),$$

where $\varphi_1$ is the azimuth angle for the $i^{th}$ transmit beam and jj denotes $\sqrt{-1}$. For each UE the method for determining optimal beam-forming may be an existing method, for example as disclosed in U.S. Patent Application Publication No. 2014/0056256-A1, or as used in the IEEE 802.11ad standard.

Referring to U.S. Patent Application Publication No. 2014/0056256-A1, the document discloses a method for forming and maintaining transmission and reception beams between a transmitting and a receiving station. The transmitter transmits a set of reference signals using different beams to the receiver. Based on these, the receiver transmits back preferred beam information to transmitter. Using this information, the transmitter transmits data to the receiver using the preferred beam. A similar procedure may be used for receive beam formation, in which case the above needs to be performed over all transmitter, receiver beam pairs.

After initial optimal beam-forming, a beam-change procedure can be initiated by the receiver if necessary. Beam-changing is deemed necessary if beam-errors occur at the receiver (which can be detected from one or a number of indicators) and is performed upon reception of a beam-change request from the receiver. In addition to the beam-change procedure, which occurs upon request from the receiver, the full beam-change procedure takes place periodically. It will be appreciated that this process may be extend to determine optimal transmit beams for each UE to form the set of beams $\{b_1, b_2, \ldots, b_n\}$.

The exploration operation 502 of FIG. 5 will now be described in greater detail. Given a set of beam directions $\{\vec{b_1}, \vec{b_2}, \ldots, \vec{b_{M_j}}\}$ for a given base station j and $M_j$ UEs associated with base station j, there are $M_j!$ possible beam scheduling sequences, that is $M_j!$ possible combinations, C, for the order in which the base station could transmit beams to each UE in turn. For example the sequences $\{\vec{b}_1, b_2, \ldots, \vec{b}_{M_j}\}$, $\{\vec{b}_2, \vec{b}_1, \ldots, \vec{b}_{M_j}\}$, $\{\vec{b}_3, \vec{b}_1, \ldots, \vec{b}_{M_j}\}$, and so forth.

In the exploration procedure, each base station transmits probe signals to each UE in turn using the corresponding beams from the set of beam directions following all available or a subset of the beam-forming sequences. For each beam-forming sequence each UE measures its RSRQ, BER or other indicator of link quality for that particular sequence, and each UE reports this back to the 5G base station. After collecting this information, the base station computes the utility function, corresponding to that particular beam sequence $u_k(C_k)$. As an example, each base station may use the UE measured RSRQ or BER values for any given beam sequence, according to a non-cooperative utility function. Alternatively, base stations belonging to the same operator can cooperate by using the LTE control channel to exchange information in order to use a system level utility function, according to a cooperative utility function. An example of such a utility function is the average taken over utility functions of all base stations belonging to the same operator.

Since the number of possible configurations per base station, $M_i!$, could be quite large, in certain embodiments the base station can reduce the exploration time by considering only beam sequences that correspond to UEs that are close to the cell edge. The exploration phase then takes place only over $M'_j!$ configurations, where $M'_j$ is the number of UEs near the cell edge. The 5G base station can infer which UEs are near cell edge based on position information received from UEs or by exploiting information/control data received from the underlying LTE network.

As discussed above, the exploration space can be further cut down by excluding beam sequences that are known to cause interference to, or be subject to interference from, other 5G base stations operated by the same operator. The same reduction in exploration space may also be achieved where beam sequencing and scheduling information is available through cooperation with other operators, including for different radio access technologies.

The learning operation 504 of FIG. 5 will now be described in greater detail. Given a set of beam directions $\{\vec{b}_1, \vec{b}_2, \ldots, \vec{b}_{M_j}\}$ as obtained through the beam finding operation 502 for a give base station j and its associated $M_j$ UEs, as discussed above, there are $M_j!$ possible beam sequence combinations, C, per base station. In the learning operation 504, a probability, p, is assigned to each combination such that there are a total of $M_j!$ probabilities ranging from zero to one and equal in total to one. Two embodiments are presented by way of example.

According to a first option, a learning update is applied whereby the probability applied to each sequence is a function of the probability applied to the previous sequence and the utility function of the previous sequence. For example:

$$p_k(t+1) = p_k(t) - bu_k(t+1)/u_k^{max}(t+1),$$

where $bu_k(C_k, k)$ is the utility function obtained by using the configuration $C_k$, as measured in the exploration phase and, $$u_k^{max}(t+1),$$

is the maximum value of utility functions at exploration phase t=1. Finally, b is a parameter between 0 and 1 which adjusts the rate at which the beam sequences are adapted after each exploration phase. If b=0 then there is no adaptation. k is an index for a beam sequence, k=1, Mj!.

According to a second option, a greedy update is applied whereby only the largest utility function is taken into account:

$$p_{ik}(t+1) = 1,$$

if $u_k(C_i, k)$ is the maximum, and zero otherwise. t is an index for the exploration phase, t, t+1, t+2 and so forth. Essentially the greedy update comprises identifying the beam sequence combination with the highest utility function and ensuring that it is probabilistically selected following the selection procedure set out below, and so is likely to result in more frequent changes to the selected optimal beam sequence combination $C_{opt}$.

The learning update moderates this tendency to always switch combination each time the exploration phase 502 and learning phase 504 are performed by taking into account the utility function calculated for other beam sequence combinations. This may be advantageous to reduce the risk of switching from a combination giving an acceptable performance to one which is worse. Furthermore, it serves to ensure that over time a broader range of configurations are used which may be advantageous in a situation where there is an interference source that typically affects certain configurations severely.

Once all probabilities are updated, the base station randomly selects one of the beam scheduling sequences according to the assigned probabilities. As one example on the assumption of a set of probabilities, $$\{p_1, p_2, \ldots, p_M\},$$

for each of $M_j$ beam sequences, then one of the sequences may be randomly selected as follows. The system may calculate the cumulative probabilities, $\{p_1, p_1+p_2, p_1+p_2+p_3, \ldots\}$. Next a random number U between [0, 1] is generated. If $U<p_1$ then sequence 1 is selected. If $p_1<U<p_1+p_2$ then sequence 2 is selected. If $p_1+p_2<U<p_1+p_2+p_3$, sequence 3 is selected, and so forth. It will be seen from this that when applying the greedy update, the beam sequence combination with the highest utility function will always be selected.

Figure 6:
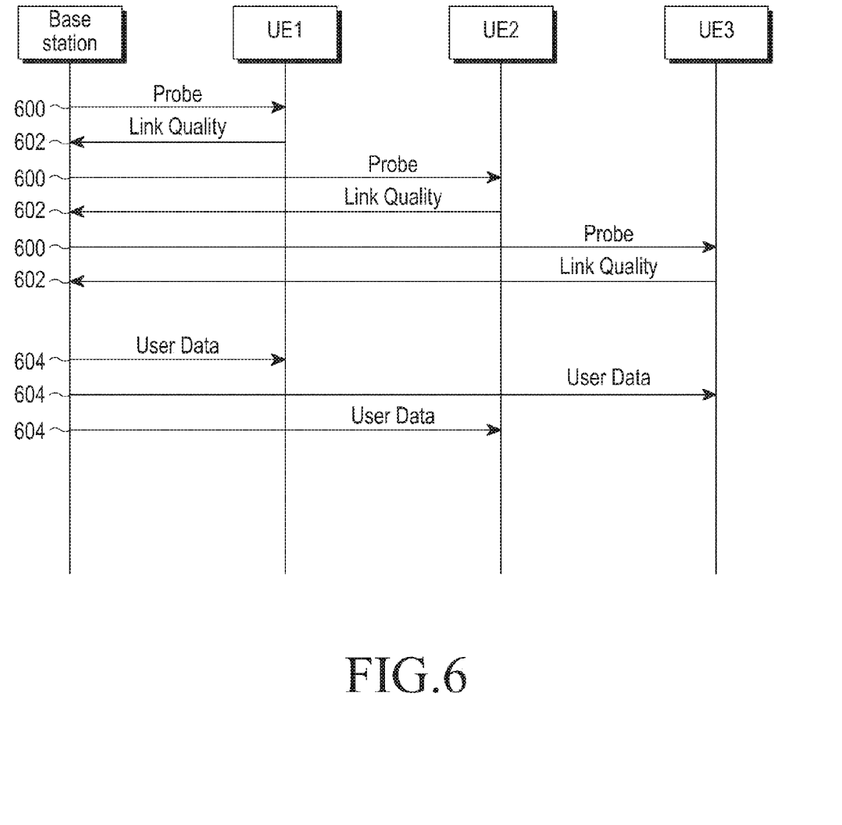
FIG. 6 is a message flow diagram according to an embodiment of the present disclosure.

FIG. 6 is a message flow diagram according to an embodiment of the present disclosure.

Referring to FIG. 6, the exchange of messages between a 5G base station and UEs within that cell is illustrated. As discussed above, during exploration phase 502 of FIG. 5 for each possible beam sequence, or each of a subset of possible beam sequences, the 5G base station sends probe signals 600 in sequence to each UE (three are illustrated in FIG. 6) using the beams (i.e., the beam directions) which are identified in the beam finding operation 500. Each UE that receives a probe signal, which may be addressed specifically to that UE, returns a measure of the link quality 602 such as an RSRQ or a BER measurement. FIG. 6 illustrates an example of a first configuration $C_j$ in which the beam sequence is for beams to transmit probe signals 600 to UE1, UE2 and UE3 in that order. Later, during the execution phase 506, the 5G base station transmits user data to each UE using the selected optimal configuration $C_{opt}$. In FIG. 6 an example is illustrated in which the optimal configuration comprises transmitting user data 604 to UE1, UE3 and UE2 in that order.

Figure 7:
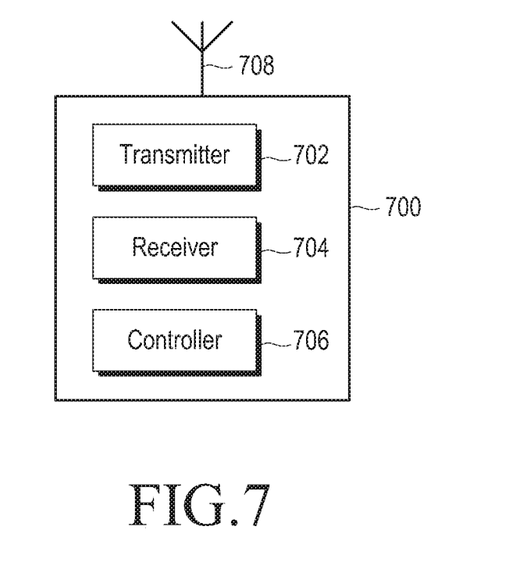
FIG. 7 illustrates a structure of a 5G base station according to an embodiment of the present disclosure.

FIG. 7 illustrates a diagram of a structure of a 5G base station which is arranged to operate according to an embodiment of the present disclosure.

Referring to FIG. 7, the 5G base station includes a transmitter 702 arranged to transmit probe signals 600 and user data 604 to UEs, a receiver 704 arranged to receive link quality feedback 604 from the UEs, and a controller 706 arranged to control the transmitter and receiver and to perform processing such as in accordance with the method of FIG. 5. The 5G base station 700 may further include an antenna 708.

Figure 8:
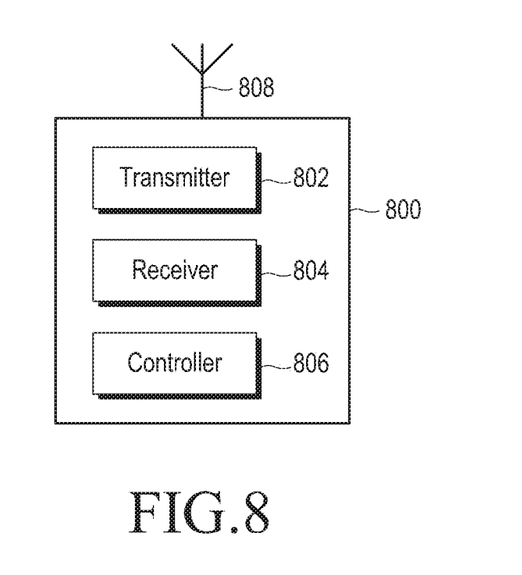
FIG. 8 illustrates a structure of a UE according to an embodiment of the present disclosure.

FIG. 8 illustrates a diagram of a structure of a UE which is arranged to operate according to an embodiment of the present disclosure.

Referring to FIG. 8, the UE includes a transmitter 802 arranged to transmit link quality feedback 604 to the 5G base station, a receiver 804 arranged to receive probe signals 600 and user data 604 from the 5G base station, and a controller 806 arranged to control the transmitter and receiver and to perform processing. The UE 800 may further include an antenna 808.

Although in FIGS. 7 and 8 the transmitter, receiver, and controller have been illustrated as separate elements, any single element or plurality of elements which provide equivalent functionality may be used to implement the examples of the present disclosure described above.

Advantageously, the present disclosure allows for beam sequence selection at a 5G base station operating in the unlicensed 60 GHz band without requiring coordination with other operators. This is achieved by exploiting the common beam-forming feature of any radio access technology that operates in the 60 GHz band, and so is equally applicable to any suitable beam-forming radio access technology (including at other frequencies). As such, it works in multi-standard and multi-operator scenarios. Various embodiments of the present disclosure are able to achieve high spectral efficiency that approaches the theoretical maximum spectral efficiency that could be achieved assuming full coordination between operators, as demonstrated by the modelling presented below. Furthermore, various embodiments of the present disclosure do not suffer from the "deafness" problem of the listen-before-talk (LBT) method, that deafness being inherent to directional transmission scenarios.

In an illustration model, two 60 GHz band 5G base stations each serve a number of UEs within their service area. For each UE, analogue beam-forming is used in order to form the optimal beam to serve that UE. Each base station has 16 antenna elements. Further parameters used in the simulations are given in Table 2 below.

TABLE 2

| Parameter | Value |
| --- | --- |
| Carrier frequency | 60 GHz |
| Bandwidth | 500 MHZ |
| Base station inter-site distance | 200, 300, 400 |
| Base station number of antennas | 16 |
| Base station inter-antenna distance | $\lambda/2$ |
| Path loss model | $61.39 + 10 \times 2.47\log(d)$ dB |
| Number of random scatter points | 3 |

Given the set of base stations, the corresponding UEs and beams associated with each UE, potential interference levels for all possible scheduling configurations were calculated and an exhaustive centralized search was performed to determine the optimal beam scheduling sequence for each base station that maximized overall system spectral efficiency. It will be appreciated that an exhaustive search is possible with a few base stations but becomes computationally prohibitive when the number of bases stations is more than a few, and so in a typical system, would be difficult or impossible to implement even if full cooperation between operators could be ensured. From this exhaustive search, the beam scheduling sequence that minimizes overall system spectral efficiency (the worse-case scheduling) was also determined.

The results were then used to benchmark the performance of beam scheduling methods according to various embodiments of the present disclosure, where each base station autonomously adapts its beam scheduling sequence without any signaling exchange with the other base station. The positions of UEs associated with each base station where chosen randomly. To obtain statistically reliable results Monte Carlo runs were performed from which the cumulative distribution function (CDF) of system spectral efficiency (according to a nominal scale) for each scenario was obtained.

Figure 9:
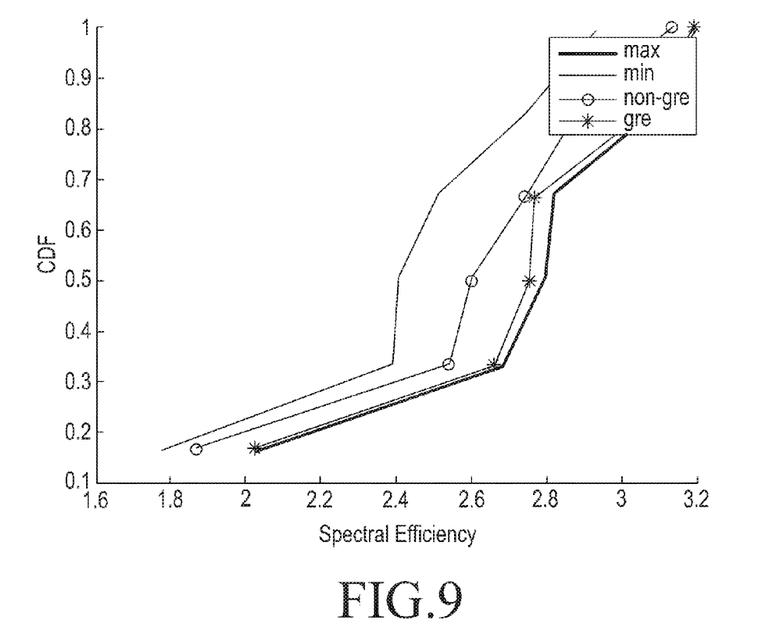
FIGS. 9 and 10 illustrate modelling results for spectral efficiency when two 5G base stations implement a beam sequence selection method according to an embodiment of the present disclosure.
Figure 10:
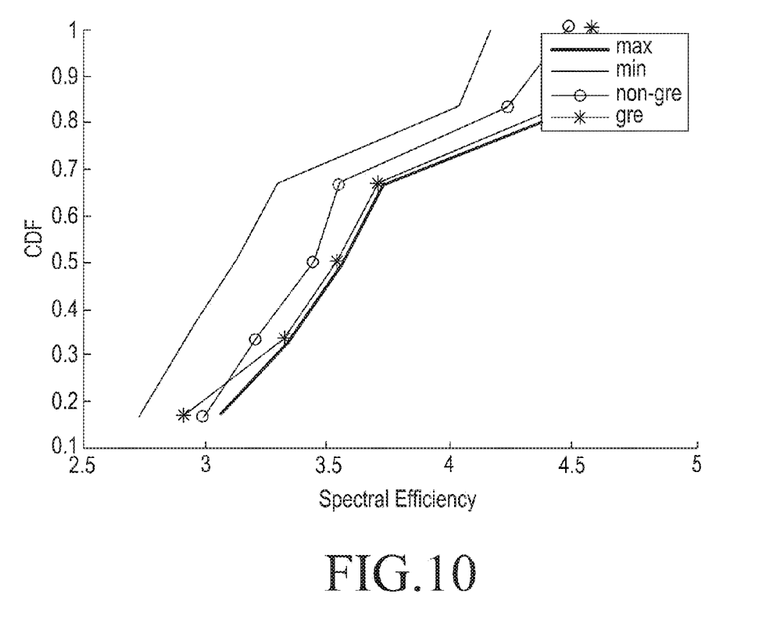

FIGS. 9 and 10 illustrate modelling results for spectral efficiency when two 5G base stations implement a beam sequence selection method according to an embodiment of the present disclosure.

FIGS. 9 and 10 show results for the case of two 60 GHz 5G base stations, each serving five UEs at their respective cell edge, obtained for different inter-site distances of 400 m and 300 m respectively between the base stations. The thick black line corresponds to maximum system spectral efficiency obtained from the exhaustive search result (corresponding to the most optimal beam scheduling) while the think black line corresponds to the worse possible beam scheduling which minimizes system spectral efficiency. There is also shown results obtained using two implementations of the proposed method, using either the greedy (marked with asterisks) or non-greedy (marked with circles) learning operation.

It can be seen that both implementations of the distributed scheduling method perform close to the theoretical maximum obtained from exhaustive search, with the greedy algorithm showing a somewhat better performance. As noted above, in certain implementation scenarios a non-greedy learning operation may be preferred to minimize the frequency of beam sequence change.

Throughout the description and claims of this specification, the words "comprise" and "contain" and variations of them mean "including but not limited to", and they are not intended to (and do not) exclude other components, integers or operations. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers or characteristics described in conjunction with a particular aspect, embodiment or example of the disclosure are to be understood to be applicable to any other aspect, embodiment or example described herein unless incompatible therewith. All of the features disclosed in this specification (including any accompanying claims, abstract and drawings), and/or all of the operations of any method or process so disclosed, may be combined in any combination, except combinations where at least some of such features and/or operations are mutually exclusive. The disclosure is not restricted to the details of any foregoing embodiments. The disclosure extends to any novel one, or any novel combination, of the features disclosed in this specification (including any accompanying claims, abstract and drawings), or to any novel one, or any novel combination, of the operations of any method or process so disclosed.

The various embodiments of the present disclosure may also be implemented via computer executable instructions stored on a computer readable storage medium, such that when executed cause a computer to operate according to any other the aforementioned embodiments.

While the present disclosure has been shown and described with reference to various embodiments thereof, it will be understood by those skilled in the art that various changes in form and detail may be made therein without departing from the spirit and scope of the present disclosure as defined by the appended claims and their equivalents.

What is claimed is:

1. A method for operating a base station in a wireless communications network, the method comprising:
    determining a set of beams for communicating with a plurality of mobile terminals;
    determining a set of beam sequences, each beam sequence comprising a unique order of beams within the set of beams;
    transmitting probe signals to the mobile terminals according to each beam sequence within the set of beam sequences;
    receiving indications of link quality from the mobile terminals in response to the probe signals;
    selecting a beam sequence within the set of beam sequences based upon the received indications of link quality; and
    communicating with the mobile terminals in accordance with the selected beam sequence,
    wherein the beam sequence is selected according to a probability assigned to each beam sequence in the set of beam sequences, and the probability assigned to each beam sequence in the set of beam sequences is assigned based on a probability assigned to a preceding sequence in the set of beam sequences and a utility function in respect to the preceding sequence computed based on the received indications of link quality.

2. The method of claim 1, wherein the determining of the set of beams comprises determining a beam direction for each of the plurality of mobile terminals.

3. The method of claim 2, wherein the plurality of mobile terminals comprises mobile terminals located within a predetermined distance inside of an edge of a cell within which the base station can communicate with mobile terminals.

4. The method of claim 3, wherein the set of beam sequences comprises:
    unique beam sequences within the set of beams; or
    a subset of unique beam sequences.

5. The method of claim 1, wherein the selecting of the beam sequence comprises:
    determining a cumulative probability in respect to each sequence in the set of beam sequences;
    randomly selecting a number between a minimum probability and a maximum probability; and
    selecting the beam sequence for which the randomly selected number exceeds the cumulative probability in respect to the preceding beam sequence in the set of beam sequences but wherein the randomly selected number is less than the cumulative probability in respect to that beam sequence.

6. The method of claim 1, wherein the probe signals are transmitted if a predetermined event occurs,
    wherein the predetermined event comprises:
        an expiration of a timer; or
        a detected change in the link quality greater than a threshold when communicating with mobile stations.

7. The method of claim 1, further comprising:
    receiving further indications of link quality when communicating with the mobile terminals in accordance with the selected beam sequence; and
    detecting a change in link quality based upon the received further indications of link quality.

8. The method of claim 7, further comprising wherein the set of beams are determined in response to detecting a change to a composition of the plurality of mobile terminals.

9. A non-transitory computer readable storage medium having stored thereon computer executable instructions which when executed by a computer cause the computer to perform the method of claim 1.

10. A method for operating a mobile terminal in a wireless communications network, the method comprising:
    receiving probe signals from a base station according to each beam sequence within a set of beam sequences, applied by the base station, the each beam sequence comprising a unique order of beams within a set of beams;
    transmitting an indication of link quality to the base station in respect to a received probe signal; and
    communicating with the base station in accordance with a beam sequence established by the base station based on the transmitted indication of link quality,
    wherein the beam sequence established by the base station is selected within the set of the beam sequences,
    wherein the beam sequence is selected according to a probability assigned to each beam sequence in the set of beam sequences, and the probability assigned to each beam sequence in the set of beam sequences is assigned based on a probability assigned to a preceding sequence in the set of beam sequences and a utility function in respect to the preceding sequence computed based on the received indications of link quality.

11. The method of claim 10, wherein the communicating with the base station further comprises transmitting a further indication of link quality to the base station upon receipt of data transmitted to the mobile terminal.

12. The method of claim 10, wherein communication between the base station and the mobile terminal is based on directional beams within an unlicensed frequency band.

13. The method of claim 12, wherein the unlicensed frequency band comprises a 60 GHz band.

14. A non-transitory computer readable storage medium having stored thereon computer executable instructions which when executed by a computer cause the computer to perform the method of claim 10.

15. A base station in a wireless communications network, comprising:
    a controller, configured to:
        determine a set of beams for communicating with a plurality of mobile terminals, and
        determine a set of beam sequences, each beam sequence comprising a unique order of beams within the set of beams;
    a transmitter, configured to transmit probe signals to the mobile terminals according to each beam sequence within the set of beam sequences; and
    a receiver, configured to receive indications of link quality from the mobile terminals in response to the probe signals,
    wherein the controller is further configured to select a beam sequence within the set of beam sequences based upon the received indications of link quality, and wherein the transmitter is further configured to communicate with the mobile terminals in accordance with the selected beam sequence, wherein the beam sequence is selected according to a probability assigned to each beam sequence in the set of beam sequences, and the probability assigned to each beam sequence in the set of beam sequences is assigned based on a probability assigned to a preceding sequence in the set of beam sequences and a utility function in respect to the preceding sequence computed based on the received indications of link quality.

16. The base station of claim 15, wherein communication between the base station and the mobile terminals is based on directional beams within an unlicensed frequency band.

17. A mobile terminal in a wireless communications network, comprising:

a receiver, configured to receive probe signals from a base station according to each beam sequence within a set of beam sequences, applied by the base station, the each beam sequence comprising a unique order of beams within a set of beams;

a transmitter, configured to transmit an indication of link quality to the base station in respect to a received probe signal; and a controller, configured to communicate with the base station in accordance with a beam sequence established by the base station based on the transmitted indication of link quality, wherein the beam sequence established by the base station is selected within the set of the beam sequences, wherein the beam sequence is selected according to a probability assigned to each beam sequence in the set of beam sequences, and the probability assigned to each beam sequence in the set of beam sequences is assigned based on a probability assigned to a preceding sequence in the set of beam sequences and a utility function in respect to the preceding sequence computed based on the received indications of link quality.

\* \* \* \* \*